A. PARTRIDGE.

Assignor of one-half to D. F. SWEENEY.

SAFETY RAZOR.

No. 10,748. Reissued July 27, 1886.

Witnesses:
Alex. Scott
Jas. W. Wolcom

Inventor:
Andrew Partridge,
By Simonds & Burdett.
Attys

UNITED STATES PATENT OFFICE.

ANDREW PARTRIDGE, OF SPRINGFIELD, MASSACHUSETTS, ASSIGNOR OF ONE-HALF TO DENNIS F. SWEENEY, OF SAME PLACE.

SAFETY-RAZOR.

SPECIFICATION forming part of Reissued Letters Patent No. 10,748, dated July 27, 1886.

Original No. 326,885, dated September 22, 1885. Application for reissue filed December 16, 1885. Serial No. 185,868.

*To all whom it may concern:*

Be it known that I, ANDREW PARTRIDGE, a citizen of the United States, residing at Springfield, in the county of Hampden and State of Massachusetts, have invented new and useful Improvements in Safety-Razors, of which the following is a specification.

Figure 1:
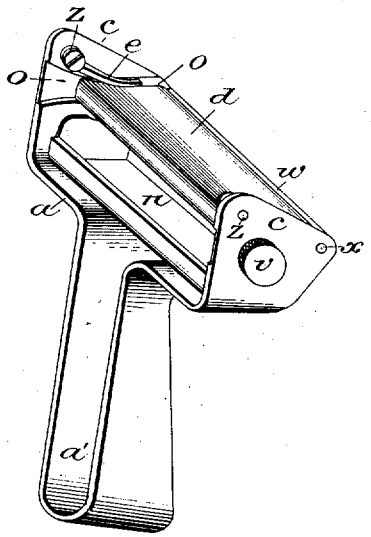
Figure 2:
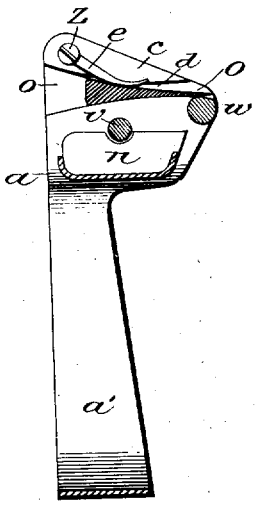

In the drawings forming part of this specification, Figure 1 is a perspective view of a safety-razor constructed according to my invention. Fig. 2 is a vertical section about centrally between the ends of the blade in Fig. 1.

In the drawings *a* is the frame holding the blade, the guard, and the cup, having integral therewith the loop-shaped part *a'*, which constitutes the handle of the razor, and a spring-connection between the cheek-pieces *c c*, which permits the latter to be spread apart or drawn toward each other, as hereinafter described. The said frame *a* is made of brass or other metal having the requisite spring quality, and each of its cheek-pieces *c* has a groove, *o*, in its inner side extending across it, as shown, to receive the end of the blade *d*. Said groove permits of putting the blade between the cheek-pieces from the rear side, and is of sufficient width at the edge of the blade to allow said edge to be adjusted at will more or less toward or from the guard *w*, which is located under the edge of the blade.

When the grooves *o* are made of the form above described, a spring, *e*, is attached to each cheek-piece by a screw, *z*, or other suitable means, whose end bears on the blade to hold it against the under edges of said grooves, and provides a yielding frictional contact with the blade, whereby the latter is more conveniently adjusted with its edge in a proper position over the guard *w*.

If desired, the grooves *o* in said cheek-pieces may be made of the form of a cross-section of the blade *d*, and hold the latter without means of adjusting it relatively to the guard *w*, as above described; but it is preferable to have the grooves made of the form shown. The guard *w* consists, substantially, of a cylindrical bar, either hollow or solid, having on each end a projection, *x*, Fig. 1, entering a hole in the cheek-piece *c*, but fitting freely therein, to allow the above mentioned movement of the latter.

A screw-rod, *v*, having a suitable head on one end, by which it is turned, passes through one of the cheek pieces *c*, and screws into the opposite one, thereby providing means for clamping the cheek-pieces against the ends of the blade *d*, and holding the latter firmly. When the rod *v* is unscrewed, the cheek-pieces spring apart, freeing the blade, so that it may be removed or adjusted.

A lather-cup, *n*, of thin metal, is located between the cheek-pieces *c*, extending from one to the other, or nearly so, and it is held in place by the cheek-pieces when the latter are drawn toward each other, as aforesaid, and against the ends of the cup; or the cup may have its ends extended high enough to let the rod *v* pass through them, and by that means be attached to the frame *a*. Said cup has its front side extending sufficiently under the guard *w* to catch the lather, which, when the razor is used, passes between the guard and the edge of the razor-blade. If desired, the apparatus may be used without the cup *n*, and be quite as serviceable for shaving.

What I claim as my invention is—

1. In combination, the frame *a*, bearing cheeks *c*, carrying grooves *o*, the blade *d*, fitting at its ends into said grooves, the springs *e*, bearing on the face of said blade, and the guard *w*, all substantially as described, and for the purposes set forth.

2. In combination, the flexible frame *a*, bearing cheeks *c*, the blade *d*, the guard *w*, and the screw-rod *v*, all substantially as described, and for the purpose set forth.

3. In combination, the frame *a*, having the looped spring-handle *a'*, the blade *d*, and the guard *w*, all substantially as described, and for the purpose set forth.

4. In combination, the frame *a*, blade *d*, guard *w*, and cup *n*, all substantially as described, and for the purpose set forth.

ANDREW PARTRIDGE.

Witnesses:

FRANCIS R. RICHMOND,

B. HAMMETT SEABURY.